April 25, 1967 W. V. DROBNY 3,316,039

SECTIONAL DEVICE FOR STORING AND HANDLING
TAPE REELS AND THE LIKE
Filed Aug. 12, 1964

INVENTOR
WALTER V. DROBNY
BY
Williamson & Palmatier
ATTORNEYS

United States Patent Office 3,316,039

Patented Apr. 25, 1967

3,316,039

SECTIONAL DEVICE FOR STORING AND HANDLING TAPE REELS AND THE LIKE

Walter Vernon Drobny, Minnetonka, Minn.
(E422 38th Ave., Spokane, Wash. 99203)

Filed Aug. 12, 1964, Ser. No. 389,155
3 Claims. (Cl. 312—20)

This invention relates to the selective filing, protective storing and handling of sound and picture tapes and films, and the like, including disc playing records of the various types.

Various cassettes or containers have been employed for the storing of film and sound record tape-reels to protect them from dust and mechanical damage from friction and contact. For the most part such cassettes have consisted in telescoping shell sections wherein the reels may be housed. Some prior art cassettes for reels of this type have comprised upright containers which may be disposed in side-by-side relation and sometimes interconnected to form a filing cabinet or library with accessibility to the reels from the forward faces of the containers.

In a few instances, outwardly shiftable reel holders have been provided in the containers to facilitate selective removal of the reel through outward swinging of the reel holder to a position forwardly of the container.

In the case of disc player records, various cabinets with closely spaced vertical partitions have been used, and in some few instances, protective flexible envelopes for the individual records have been employed having shiftable relation with the thin compartments for housing.

The few cassettes which have employed shiftable holders for film or sound reels, or for playing records, have been of rather complex nature, expensive to manufacture and have required for each reel or record unit, a separate individual container, a shiftable holding unit and an additional interconnecting means if several cassettes or units are to be interlocked or joined together to form a library or filing cabinet. None of said shiftable holders have been removable with the reel therein for rearrangement in other portions of the system or library. The purchase price of such known cassettes for filing or library use has been almost prohibitive for most users.

It is an object of my invention to greatly simplify the filing, protective storing and selelecting of tape reels in indexed library or filing cabinet fashion through my concept of a sectional cassette structure with individual carrier holders to form an indexed library or cabinet which may be added to from time to time as additional cassettes are required, and which for all sections or units, with the exception of the first or "starter" unit, eliminates the need for one large side wall of the container, thereby very materially economizing on the cost of material and labor in manufacture.

A further object is the provision of sectional, vertical shell units with integral means for interlocking and reinforcing said units together into a library structure, and with novel and improved carrier holders for each unit, adapted to swing outwardly from the front of each unit to most conveniently handle and position the desired reels or records for removal and which carrier holders may be bodily removed for rearrangement in other parts of the library when desired, from the container shells.

A further object is the combination of sectional container units with improved carrier holders, wherein the holders may be shifted from storage positions, held in such position by the weight of the reels or records and shiftable to forwardly disposed positions, facilitating removal of the individual reels and returned when reels are filed, without disturbing or frictionally engaging any parts of the container shells or holding devices, which has not been possible with the cassettes of the prior art.

A more specific object is the provision of a multiplicity of identical cassette units, each comprising a generally rectangular open shell member adapted for vertical positioning and having interconnecting means thereon for interlocking with an adjacent shell member and for reinforcing the joint between two such units and whereby the single vertical wall of each unit has the dual function of enclosing the open side of the adjacent shell, each of said units being provided with means for most advantageously pivoting and including a carrier reel holding element which has a plate on the forward end thereof for closing the forward opening of the shell. With such structure a single starter plate or wall is combined to make overall libraries or filing cabinets of various desired capacities.

The foregoing and other objects and advantages of my invention will more readily appear from the following description made in connection with the accompanying drawings wherein like reference characters refer to the same parts throughout the several views and in which.

Figures 1, 2, 3, 4:
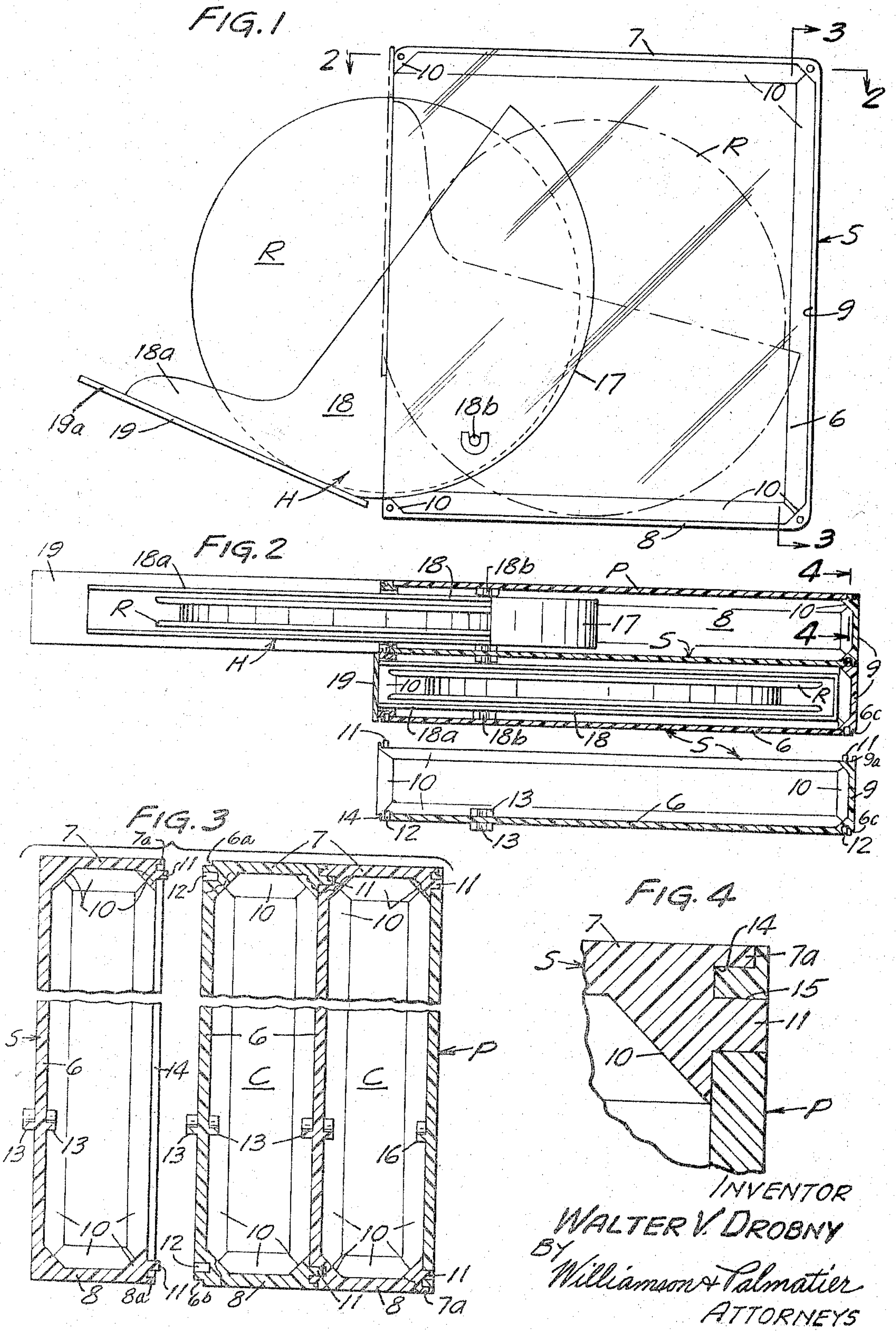
FIG. 1 is a side elevation showing a plurality of my sectional units interlocked together with the carrier holder of one of the units swung forwardly to facilitate withdrawal of a tape reel, the dotted lines indicating the storage position of the carrier holder and reel contained therein.
FIG. 2 is a horizontal section taken on the line 2—2 of FIG. 1 and wherein one of the shell units S is shown in position to be joined with the two interlocked shell units.

FIG. 3 is a vertical section taken on the line 3—3 of FIG. 1 showing the interlocking and relationship of two shell sections with a third in position to be interlocked (being shown on a larger scale than FIGS. 1 and 2); and FIG. 4 is a detail corner cross section taken substantially on the line 4—4 of FIG. 2 illustrating the interlocking of the starter plate P at one of its upper corners with a top flange wall 7 of a shell unit.

Referring now to the drawings, a plurality of multiplicity of identical cassette sections or units are employed to form a library or filing cabinet for film or tape reels or disc records. Each of the said identical units indicated as entireties by the letter S, is of rectangular shallow shell form having an enlarged rectangular vertical side wall 6, narrow top and bottom flange walls 7 and 8 and a narrow rear wall 9, all preferably integrally formed as by mold or die construction from such material as substantially rigid plastic, sheet metal or other composition. Said shell S in vertical position is entirely open at its forward side for receiving a carrier holder with a tape or film reel disposed or nested therein as will be later described.

The free edges of the top, bottom and rear flange walls 7, 8 and 9 respectively are preferably internally rabbeted to form interlocking shoulders or flanges *7a*, *8a* and *9a* respectively, which are adapted to overlie externally rabbeted portions *6a*, *6b* and *6c* in the closed and connected edges of the enlarged side wall 6 at the top, bottom and rear respectively, thus forming a snap fit interconnection and reinforcement of two shells when they are joined.

In the integral forming of the shell members S, filets all identified as 10, or angled reinforcing stock is included in all corners of the several integral walls.

To further interlock two adjacent shells, suitable means such as slightly tapered pins 11 are provided at the four corners of the main opening of each shell member, adapted to tightly and frictionally fit into locking apertured portions 12 at the four corners of the adjacent shell formed in the container wall 6 thereof. Pins 11 are preferably integrally formed with the composition of the shells, but may of course be independent and rigidly secured to the appropriate corners.

Each of the housing walls 6 of the units, carries at each side thereof, aligned trunnion-receiving elements 13 which preferably are in the form of U-shaped bearings having open upper ends for receiving and permitting release of trunnions and having rounded lower ends for constituting bearing surfaces.

To complete a multiple housing unit and to begin a library or filing cabinet for film and tape reels, a "starter" cover, as shown in the form of a plate identified as an entirety by the letter P is employed, of similar rectangular shape to the housing wall 6 and having along its outside edges, an externally rabbeted portion 14 which is adapted to interfit beneath the flanges 7*a*, 8*a* and 9*a* of any of the shell units. "Starter" plate P at its somewhat thickened edges and in the corners thereof, is provided with apertures 15 for interlocking with the pins 11 of the main shell sections or units. "Starter" plate P also carries, preferably integrally formed therewith, a U-shaped trunnion-receiving element 16 identical with the elements 13 of the shell units S and aligned therewith.

From the foregoing and by reference to the accompanying drawings, it will be seen that when two or more of the shell sections S are connected and interlocked in the manner described, and with use of the "starter" plate, a composite filing cabinet or library is formed with rigidly interconnected sections, and with one of the enlarged side walls 6 of each shell S constituting a common closed division or partition between two adjacent vertical compartments or housings. The assembly is well supported by the bottom walls 8 of the several shell units, reinforced by the upstanding large side walls 6 and the narrow rear walls 9 of each shell. The said several compartments designated as C are sealed and closed to atmosphere at top, sides and bottom and the forward ends are opened but as will be shown hereafter are closed by closure plate members of carrier holders closely cooperating with the said housings forming the compartment.

In each of the housings so formed it will be noted that a pair of trunnion-receiving bearings are opposed and aligned, which serve to pivot the carrier holders designated as entireties by the letter H, one for each compartment. Carrier holders H are deeply channeled in cross section to with freedom, nicely accommodate the thicknesses of reels for film or tape, having arcuate bottoms 17 interconnected by generally semi-circular main sides 18. Upwardly extending side extensions 18*a* extend upwardly along a line somewhat convergent with the front edge of the shell members, and at the forward edges, terminate in straight lines which when the holders are in storage position, substantially coincide with the forward vertical edges of the housings and of course, the "starter" plate P. A front closure plate 19 interconnects the forward edges of the two side extensions 18*a*, thereby reinforcing the carrier holder and serving as a complete closure for the open forward end of a housing. The arcuate bottom 17 defining the bottom of the channel formed by sides 18 is of a radius slightly greater than the largest sized tape reels, to be accommodated and of course in this size, will accommodate reels of smaller radius. Protruding from a predetermined point on each of the sides 18 is a trunnion pin 18*b*, said pins being aligned and of a diameter to be nicely accommodated in the bearings 13 of the adjacent housings and in the first section of the cabinet or library of course, in trunnion 16 of the "starter" plate P.

The position of the trunnion bearings 13 (and 16 in the case of the "starter" plate P) and of the trunnions 18*b* relative to the carrier holders H, and in regard to the housings formed by the assembled shells S, is of great importance for the effective operation in handling, filing and selectively removing reels from the cassettes. First, it is essential that the pivot axes of the holders relative to the housings be disposed substantially forwardly of the center of gravity of the respective holder and the reel or records held therein, so that the weight of the holder and with or without the contained reel, positively causes the holder to remain in stored position with its bottom and central portion resting upon the bottom of the housing, and with the plate 19 disposed flush against the edges of the two front walls of the particular housing.

Secondly it is important that the said pivot axis is disposed at a point where a minimum lifting action of the rear portion of the holder and reel takes place, when the holder is swung outwardly through an arc of approximately 65 to 75° so that a compact housing with top flange walls spaced only a short distance above the reel or records contained therein will be possible.

Thirdly it is important that in such swinging action as described through an arc of not over 75°, that a considerable proportion of the periphery of the reel contained in the holders, be exposed for removal and furthermore, that plate 19 which closes the opening when the device is stored, be upwardly inclined with reference to the general shape of the holders so that the circular reel cannot roll out forwardly.

Generally speaking, the pivot axes for the trunnions of the carrier holders H should be close to, or along an oblique line intersecting the forward lower corner of the respective housings S and also the radial or concentric center for the arcuate line of the holder arcuate bottom 17. The pivot axis should be close to the bottom of the holder approximately along the said oblique line. When the axis is so predetermined the upward lifting of the carrier holder and consequently the reels or records disposed nested therein, is minimum in the swinging of the holder and the shifting position of the holder is mainly in an outward direction. This means that there will be in normal operation, no rolling of the reel relative to the holder in the handling and carrying of a reel from its stored position where the bottom 17 of holder H rests upon the case of the unit to the outward accessible position shown in FIG. 1.

As a nicety of construction the outward movement of holder H will be stopped or limited by abutment of the forward or bottom arcuate edge 17 of holder H against the thickened triangular filet 10. While in inward position, the device is so adjusted that simultaneous abutment of the inward face of the closure plate 19 with the forward edges of the walls of the housing occurs as the arcuate bottom 17 of the holder engages against the bottom wall 8 of the respective housing. This assures little wear or impact of the related parts, which is important when my device is made of wear abrasive material such as plastic.

The outer extremity 19*a* of each closure plate 19 slightly overlaps the rounded forward corner of top wall 7 providing a finger piece 19*a* for manipulating the holder.

It is often desirable, in a sectional library or filing cabinet employing my sectional structure with a shiftable carrier holders, to rearrange tape reels or player records without disturbing them within their folding devices. To remove any one of the reel-holders from its respective housing unit the holder and reel therein are first swung outwardly to the position shown in full lines in FIG. 1. Then the holder is lifted a slight distance (by grasping the plate 19) to disengage the trunnions 18*b* from the arcuate trunnion bearings 13. The carrier holder may then be easily introduced into the new desired location or housing and the trunnions 18*b* dropped into the appropriate U-shaped trunnion bearings 13.

From the foregoing description it will be seen that with my new improved sectional structure the units may be readily interlocked, aligned and united to form elongated libraries. Interlocked assemblies may be arranged and supported, tier upon tier without additional shelving or support to form quite voluminous libraries for filing cabinets.

In the embodiment of my invention illustrated in the drawings, all parts and components of my structure are made from transparent plastic but it will of course be understood that translucent or opaque plastic, composition or alternatively, metal may be employed as the material for my structures.

Each shell unit S may be integrally formed in all its parts from one molding operation, including the interlocking pins and trunnion bearings. Likewise, the carrier holders may be molded integrally throughout in one molding operaiton, including the provision of the trunnions 18*b*. The cost of labor and materials after initial expensive adequate molds is exceedingly low and enables my sectional device to be marketed very economically. A library of a number of units may be started and as the user requires more cassettes with carrier holders, the sectional units may be purchased and added from time to time to the initial structure, all without requiring outside supports, interlocking means or braces.

In the use of my structure for protectively storing and handling disc player records, the usual paper protective envelopes for individual records can be used and sequence-related records disposed in each of the carrier holders of the size and proportions illustrated in the drawings, or special sectional shells of much less width may be made for individual records, all within the scope of my invention.

It will of course be understood that various changes may be made in the form, details, arrangements and proportions of the various parts without departing from the scope of my invention.

In the foregoing specification and in the claims herein the words "tape reels or the like" are intended to include reels for sound tape and picture film as well as similar reels on which other tapes or films are wound, as well as disc records applied in covered multiples or singly.

What is claimed is:

1. Sectional library construction for protective storage and handling of tape reels and the like having in combination, a plurality of similar interconnectible vertical housing units, each comprising a substantially rectangular shell having a relatively large-area, vertical side wall, and narrow top, bottom and rear walls perpendicularly affixed thereto, said shell configuration leaving the front and one side of said housing unit open, marginal coupling elements adjacent upper and lower edges of said side wall of each unit and complementary marginal coupling elements adjacent the upper and lower edges of said narrow top and bottom walls, the coupling elements of one housing unit releasably and snugly interlocking with the complementary coupling elements of a second unit when said units are pressed together in horizontally aligned, corresponding relation, the vertical large side wall of one unit then serving also as a side wall of an adjacent unit, a carrier holder for each unit comprising a channeled member having a bottom of curved shape for vertically supporting a tape reel or the like and having a rectangular closure plate extending approximately tangential to said curved bottom and fitting over and substantially covering the front opening of a unit, means for rotatably mounting each of said holders between two spaced side walls of two adjacent housing units to effect inward storage disposal of a holder within the confines of a housing unit and the adjacent wall of an adjacent unit and to also effect outward swinging of said holder forwardly of the forward opening of its related shell unit to facilitate removal of the reel or the like contained in said holder, and a vertical starter cover of shape and size to close the open side of an end housing unit when several of said units are interconected in multiple, said starter cover having marginal coupling elements adjacent upper and lower edges thereof substantially identical to said coupling elements adjacent the upper and lower edges of said side wall of each unit.

2. The structure set forth in the preceding claim further characterized by said rotatable mounting means for each of said holders comprising a pair of aligned trunnions projecting horizontally short distances from the respective sides of each holder, and the vertical side walls of each of said rectangular housing units at both of the vertical surfaces thereof having bearing surfaces for accommodating and supporting said trunnions.

and said starter cover having on its inner vertical side a similar supporting bearing surface.

3. The structure set forth in the preceding claim further characterized by said bearing surfaces being formed by open topped U-shaped elements connected with the respective wall surfaces of said vertical side walls of said housing units to accommodate and support the respective trunnions of each holder and to provide for ready removal of each holder by upward lifting of the trunnions from said U-shaped bearing surfaces.

References Cited by the Examiner

UNITED STATES PATENTS

| | | | |
|---|---|---|---|
| 381,155 | 4/1888 | McBride | 225—37 X |
| 448,138 | 3/1891 | Ford | 225—38 X |
| 826,666 | 7/1906 | Kaufman | 225—38 X |
| 876,866 | 1/1908 | Downing | 225—38 X |
| 1,144,736 | 6/1915 | Smith | 312—20 |
| 1,208,957 | 12/1916 | Handy | 225—34 X |
| 1,371,786 | 3/1921 | Hummell | 206—52 |
| 3,051,537 | 8/1962 | Diehl | 312—20 |

FOREIGN PATENTS

| | | |
|---|---|---|
| 962,945 | 12/1949 | France. |
| 440,309 | 2/1927 | Germany. |
| 105,774 | 5/1917 | Great Britain. |

CLAUDE A. LE ROY, *Primary Examiner.*

A. FRANKEL, *Assistant Examiner.*